United States Patent
Ding

(10) Patent No.: US 12,353,433 B2
(45) Date of Patent: Jul. 8, 2025

(54) EXTRACTION FROM AN INTERNAL REPOSITORY FOR REPLICATION MANAGEMENT SYSTEM IN A DATA INTELLIGENCE

(71) Applicant: SAP SE, Walldorf (DE)

(72) Inventor: Xuemin Ding, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/081,321

(22) Filed: Dec. 14, 2022

(65) Prior Publication Data

US 2024/0202209 A1 Jun. 20, 2024

(51) Int. Cl.
*G06F 16/27* (2019.01)
*G06F 16/2455* (2019.01)

(52) U.S. Cl.
CPC ........ *G06F 16/27* (2019.01); *G06F 16/24568* (2019.01)

(58) Field of Classification Search
None
See application file for complete search history.

(56) References Cited

U.S. PATENT DOCUMENTS

| | | | |
|---|---|---|---|
| 10,908,999 B2 | 2/2021 | Natanzon et al. | |
| 10,997,208 B2 | 5/2021 | Du et al. | |
| 2016/0071059 A1* | 3/2016 | Petering | G06Q 10/103 705/301 |
| 2018/0367528 A1* | 12/2018 | Schwarz | H04L 63/0807 |
| 2020/0034254 A1* | 1/2020 | Natanzon | G06F 9/455 |
| 2020/0186422 A1* | 6/2020 | Fildebrandt | G06F 9/505 |
| 2021/0011812 A1 | 1/2021 | Mitkar et al. | |
| 2021/0240579 A1* | 8/2021 | Khandkar | G06F 16/27 |
| 2022/0188089 A1 | 6/2022 | Lele et al. | |
| 2022/0337417 A1* | 10/2022 | Sanders | H04L 9/0643 |

(Continued)

FOREIGN PATENT DOCUMENTS

| | | |
|---|---|---|
| CN | 112199435 A | 1/2021 |
| CN | 112527459 A | 3/2021 |
| CN | 114691425 A | 7/2022 |

OTHER PUBLICATIONS

Hwang, C., "Deploy a highly available MySQL Database System in a Container Engine for Kubernetes cluster," from https://docs.oracle.com/en/solutions/oci-mysql-oke-ha/index.html#GUID-70708B09-BDDD-40C3-961B-9E13B629CD0A , 6 pages, printed Sep. 15, 2022.

(Continued)

*Primary Examiner* — Taelor Kim
(74) *Attorney, Agent, or Firm* — Sterne, Kessler, Goldstein & Fox P.L.L.C.

(57) ABSTRACT

Disclosed herein are system, method, and computer program product embodiments for extracting data to stream to a user interface using a client library and configuration file. An embodiment operates by receiving the configuration file from a replication management system (RMS). The embodiment accesses a RMS pod using the client library. The embodiment retrieves a list of tables in a repository using the client library. The embodiment chooses at least one table from the list of tables. The embodiment downloads data from the at least one table. The embodiment exports the data in a readable file format. The embodiment then streams the exported data to the UI.

20 Claims, 5 Drawing Sheets

(56) References Cited

U.S. PATENT DOCUMENTS

2023/0106269 A1\* 4/2023 Mitkar ............... G06F 11/3006
707/654

OTHER PUBLICATIONS

Maayan, G., "SQL Database on Kubernetes: Considerations and Best Practices," SQLShack, from https://www.sqlshack.com/sql-database-on-kubernetes-considerations-and-best-practices/, 9 pages, Jun. 22, 2020.

\* cited by examiner

Repository table metadata

Table name: DATAHUB_DEFAULT.com.sap.datahub.rms.rt::TASKS

| COLUMN NAME | DATA TYPE | LENGTH | IS PRIMARY KEY |
|---|---|---|---|
| TASK_ID | NVARCHAR | 36 | ✓ |
| CONSTELLATION_ID | NVARCHAR | 36 | ✓ |
| NAME | NVARCHAR | 256 | |
| PRIORITY | INTEGER | 10 | |
| LOAD_TYPE | NVARCHAR | 16 | |
| SCHEDULE_TYPE | NVARCHAR | 16 | |
| ACTIVE | BOOLEAN | 2 | |
| OPERATION | NCLOB | 2147483647 | |
| PARTITIONING_STATE | NCLOB | 2147483647 | |
| SETUP_METADATA | NCLOB | 2147483647 | |
| CDC_COMPONENT | NCLOB | 2147483647 | |
| RECOVER_STATUS | INTEGER | 10 | |
| STATUS | INTEGER | 10 | |
| ERROR_CAUSE | NVARCHAR | 5000 | |
| RETRY_AT | TIMESTAMP | 27 | |
| RETRY_LEVEL | INTEGER | 10 | |
| RETRY_REASON | NVARCHAR | 256 | |
| TENANT | NVARCHAR | 256 | |

TABLES

| | A | B | C | D | E | F | G | H |
|---|---|---|---|---|---|---|---|---|
| | SPACE_ID | TABLE_NAME | DESCRIPTION | TENANT | CREATED_AT | CREATED_BY_USER | CHANGED_AT | CHANGED_BY_USER |
| 1 | | | | | | | | |
| 2 | "d34a18c2-df3b-4c0b... | "MARM_2K" | "MARM_2K" | "default" | "2021-10-21 20:56... | "testuserc" | "2021-10-21 20:56... | "testuserc" |
| 3 | "a73d2f54-3289-4341... | "MARM_2K" | "MARM_2K" | "default" | "2021-10-21 20:56... | "testuserc" | "2021-10-21 20:56... | "testuserc" |
| 4 | "3fbfdfe0-aee92-4eb3... | "MARM_2K" | "MARM_2K" | "default" | "2021-10-21 21:03... | "testuserc" | "2021-10-21 21:03... | "testuserc" |
| 5 | "0b51e8b2-df2a-4bc3... | "MARM_2K" | "MARM_2K" | "default" | "2021-10-21 21:03... | "testuserc" | "2021-10-21 21:03... | "testuserc" |
| 6 | "5460f7a3-e754-472b... | "MARM_2K" | "MARM_2K" | "default" | "2021-10-26 08:13... | "testuserc" | "2021-10-26 08:13... | "testuserc" |
| 7 | "6e307f96-da73-4a41... | "MARM_2K" | "MARM_2K" | "default" | "2021-10-26 08:13... | "testuserc" | "2021-10-26 08:13... | "testuserc" |

FIG. 3

EXTRACTION FROM AN INTERNAL REPOSITORY FOR REPLICATION MANAGEMENT SYSTEM IN A DATA INTELLIGENCE

BACKGROUND

A replication management system (RMS) may be a component of a Data Intelligence (DI) system. The RMS may provide efficient ways to replicate data from different source systems (e.g., databases, object storage, or event streaming platforms) to different destination systems (e.g., databases or other types of object storage). This can ensure that information is shared consistently between redundant resources, such as software or hardware components, thereby improving reliability, fault-tolerance, and accessibility. The DI may have an internal repository database such as, but not limited to, an in-memory, column-oriented relational database management system. The internal repository database may be deployed in a pod in a DI cluster. The pod may be a container orchestration system. Developers often need to analyze data in the repository in order to troubleshoot and find errors. For example, developers may access the data in the repository by issuing specific commands to the internal repository database pod. But developers often cannot access all the data in the repository. For example, it is often not possible to export the entire data from a table. In addition, querying data from the repository using manually input structured query language (SQL) statements is often slow. Finally, even once the query is finished, it is often not possible to access the data in a useable form as the data returned is not easy to read.

BRIEF DESCRIPTION OF THE DRAWINGS

The accompanying drawings are incorporated herein and form a part of the specification.

FIG. 3 depicts metadata of a table and the downloaded content of the table, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
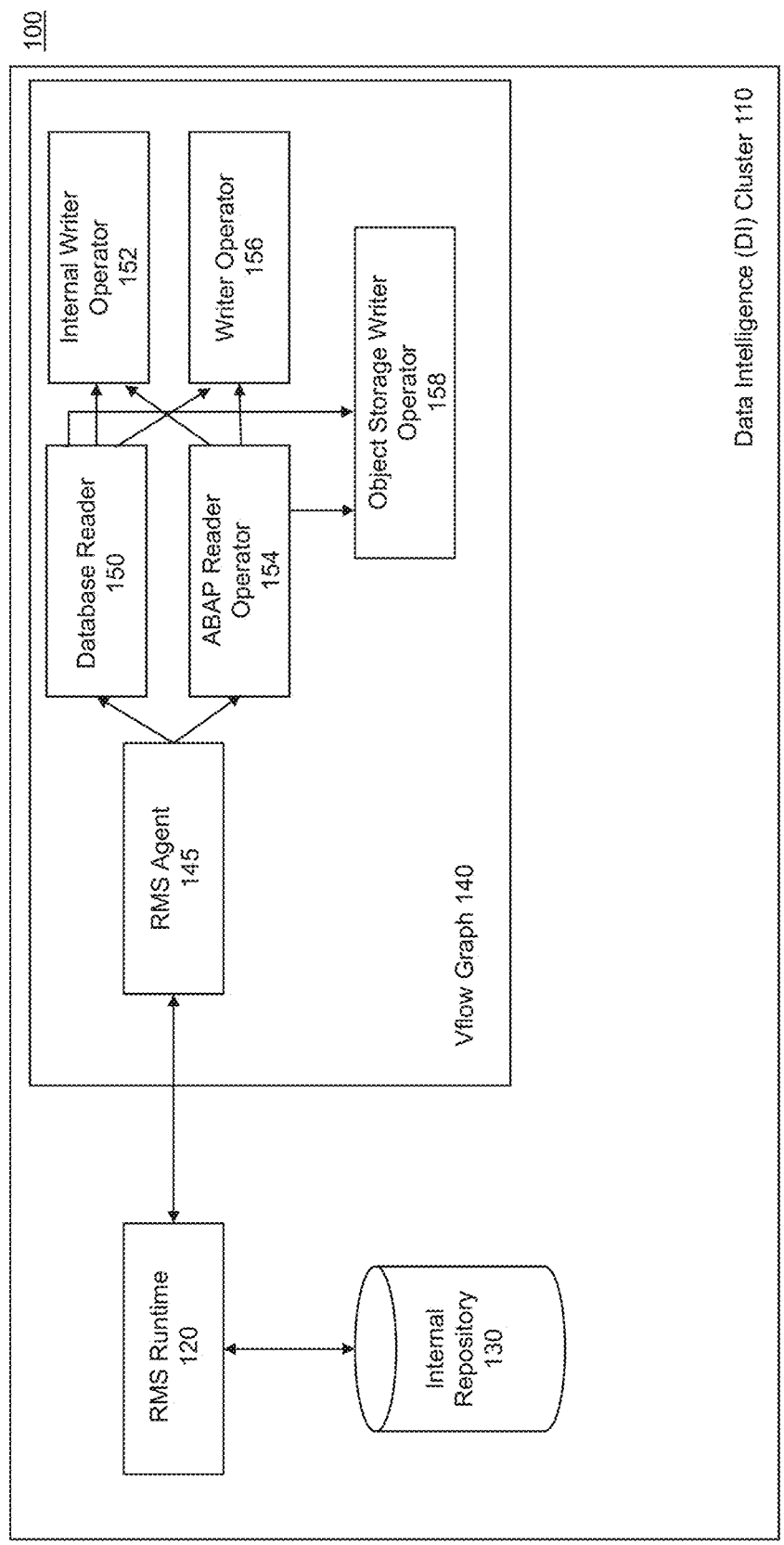
FIG. 1 is a block diagram of a replication management system in a data intelligence system, according to some embodiments.

Provided herein are system, apparatus, device, method and/or computer program product embodiments, and/or combinations and sub-combinations thereof, for extracting data to stream to a user interface (UI) using a client library and configuration file.

A replication management system (RMS) may be a component of a Data Intelligence (DI) system. The RMS may have an internal repository database. The internal repository database may be an in-memory, column-oriented, relational database management system. The internal repository database (e.g., an in-memory, column-oriented, relational database management system) may be deployed in a pod in a cluster of the DI system. The DI cluster may be implemented in a cloud computing platform. The DI may be a platform used to explore data.

The RMS may provide ways to replicate data from different source systems (e.g., databases or advanced business application programing (ABAP) systems) to different destination systems (e.g., databases or other types of object storage).

Several vertical flow (vflow) operators may read or write data, such as database readers, ABAP reader, or a database writer, between the database and files. Vflow may be a library that allows for simplifying analysis. For example, vflow may replace a single function (e.g., preprocessing) with a set of functions. Vflow may then be used to access the stability of downstream results. Furthermore, vflow may allow for automatic parallelization and caching throughout a work pipeline.

RMS may have a main service RMS-RT, which may represent a RMS runtime (RT) service. RMS-RT may be a central management system, which may orchestrate different workflows for each replication task. To memorize the state of each workflow and task, the RMS-RT service may persist data in the internal repository. RMS-RT may communicate with the internal repository to save information, such as tasks, space, partitions, errors, or the like. Tasks may include priority, load, schedule, or name.

The main function of the relational database management system is to store and retrieve data as it is requested by applications. The relational database management system may also perform advanced analytics such as predictive analytics, spatial data processing, text analytics, text search, streaming analytics, graph data processing, or the like. The relational database management system may include extract, transform, load (ETL) capabilities and an application server.

Developers, in general, may need to analyze data in the relational database repository to troubleshoot issues or problems. For example, the errors may be in the cluster environment or the like. Typically, develops may access the relational database repository using a container orchestration system (e.g., Kubernetes) and the configuration file therein. The container orchestration system may be a system for automating software deployment, scaling, and management. Using commands within the container orchestration system, the relational database pod may be entered and a Structured Query Language (SQL) command line tool may be used to query the data. However, this approach suffers from at least three technological problems. First, querying data using the approach of manually inputting SQL statements is often slow and inefficient. Second, it is often not possible to export the entire data from a table using this approach. And it is often not possible to discern the relationships between tables. Finally, it is often not possible to access the data in a useable form (e.g., the data returned is often hard to read).

To solve these technological problems, embodiments herein utilize a RMS test tool that combines a container orchestration system's client library and an associated configuration file to efficiently query data in the repository and present such data in a usable form. By developing such a RMS test tool, data may be accessed more quickly since it is not being downloaded, and the data may be explored more efficiently as it is provided in a useable format.

Moreover, by developing such a RMS test tool, the output data, once extracted, may be streamed to a UI. Developers may choose the configuration file of the container orchestration system and use the RMS test tool to list all of the tables from the repository. Within the data is the metadata of the table and the table itself may be exported, for example in comma-separated values (csv) format. The metadata may include data surrounding the tasks and may contain several partitions.

Different errors may be present in the extracted data that a developer may be interested in. For example, if a replication task failed, a detailed error message may be in a table from the RMS repository. Within the table, related objects information may be found, such as the source or target connection that was used. This information may be useful in preventing the error in the future.

Additionally, task metric information may be in a table from the RMS repository. The task metric may provide information such as the time consumed on each operation, the volume processed, etc. The RMS repository version information may be stored in one of the settings table. Because the schema of the table may be changed, such as by adding a new column or table to the RMS repository, the version of the schema may need to be checked to ensure the most up to date version is being used.

In addition to enabling the efficient querying of data in a repository and presentation of such data in a usable form, embodiments herein enable developers to more effectively identify errors in a cluster of a DI through a simplified analysis of the internal repository data.

FIG. 1 is a block diagram 100 of a RMS in a DI system, according to some embodiments. As a convenience and not a limitation, FIG. 1 may be described with reference to elements of FIG. 2. Block diagram 100 may represent the operation of extracting output data to stream to a UI using a client library and configuration file. The client library may be, for example, a Kubernetes client API. Block diagram 100 may also be performed by computer system 500 of FIG. 5. But block diagram 100 is not limited to that embodiment, and other systems may be used to perform the method as will be understood by those skilled in the art. It is to be appreciated that not all operations may be needed, and the operations may not be performed in the same order as shown in FIG. 1.

FIG. 1 includes a DI cluster 110. The DI may be deployed in a simulated environment (e.g., docker compose), but in production a cluster is often used. DI cluster 110 includes an internal repository 130, RMS runtime 120, and vflow graph 140. The internal repository 130 may be an internal container orchestration system pod in the DI cluster 110 that is not accessible from the outside the DI cluster 110. The internal repository 130 may connect to the RMS runtime 120. The RMS runtime 120 may connect to the RMS agent 145, which is inside the vflow graph 140. The RMS agent 145 may be deployed anywhere within the system 100 and it may communicate with a RMS pod and an internal database pod by using the client's API. Additionally, the RMS agent 145 may consume a work order from the RMS runtime 120 and dispatch the work order to those operators to perform a replication task.

The vflow graph 140 may include a database reader 150, an ABAP reader operator 154, an internal writer operator 152, a writer operator 156, and an object storage writer operator 158.

The RMS agent 145 may connect to the database reader 150 or the ABAP reader operator 154. The database reader 150 may connect to the internal writer operator 152, the writer operator 156, or the object storage writer operator 158. The ABAP reader operator 154 may connect with the internal writer operator 152, the writer operator 156, or the object storage writer operator 158.

Since the internal repository 130 is not accessible from outside the DI cluster 110, developers may attempt to access the internal container using the command line, and then connect to the internal instance using a database structured query language (DBSQL) tool DBSQL may be a command line tool for executing commands on internal databases. Developers may need to run a query inside the DBSQL tool to get content data from the internal repository 130. However, this process is often not advantageous. This is because querying data with manual input SQL statements is often slow. In addition, the data returned by the DBSQL tool may not be easy to read. Finally, the DBSQL tool may not be able to export the entire data from a table in the internal repository 130.

A RMS test tool may be utilized to solve the above technological problems. The RMS test tool, together with a client library (e.g., implemented in Java or another programming language), may automate the process of exploring the internal repository 130. An execute command using the RMS test tool may be used to access the container orchestration system pod. For example, using the command line in the container orchestration system, the RMS container orchestration system pod may be accessed and the RMS API may be called. Once called, the internal repository 130 credentials may be provided. Then the command line in the container orchestration system may be used to access the internal pod. Commands in the DBSQL tool may be used to connect to the internal repository 130 and execute a query to get all repository tables names in one query. For each table, the same steps may be performed again to get the data. This process may then be automated using a custom RMS test tool, which may be deployed anywhere in the system. After automation, the results may be shown in a UI. The process is further described in FIG. 2.

A specific example may be as follows: a replication task is created within a platform. Info related to the replication task, such as task ID or error ID, may be realized. With the IDs, an error message may be present. The error message may include a detailed message, which may include technology info that a developer may find useful. Since it can't be easily accessed, a RMS tool may be realized.

Figure 2:
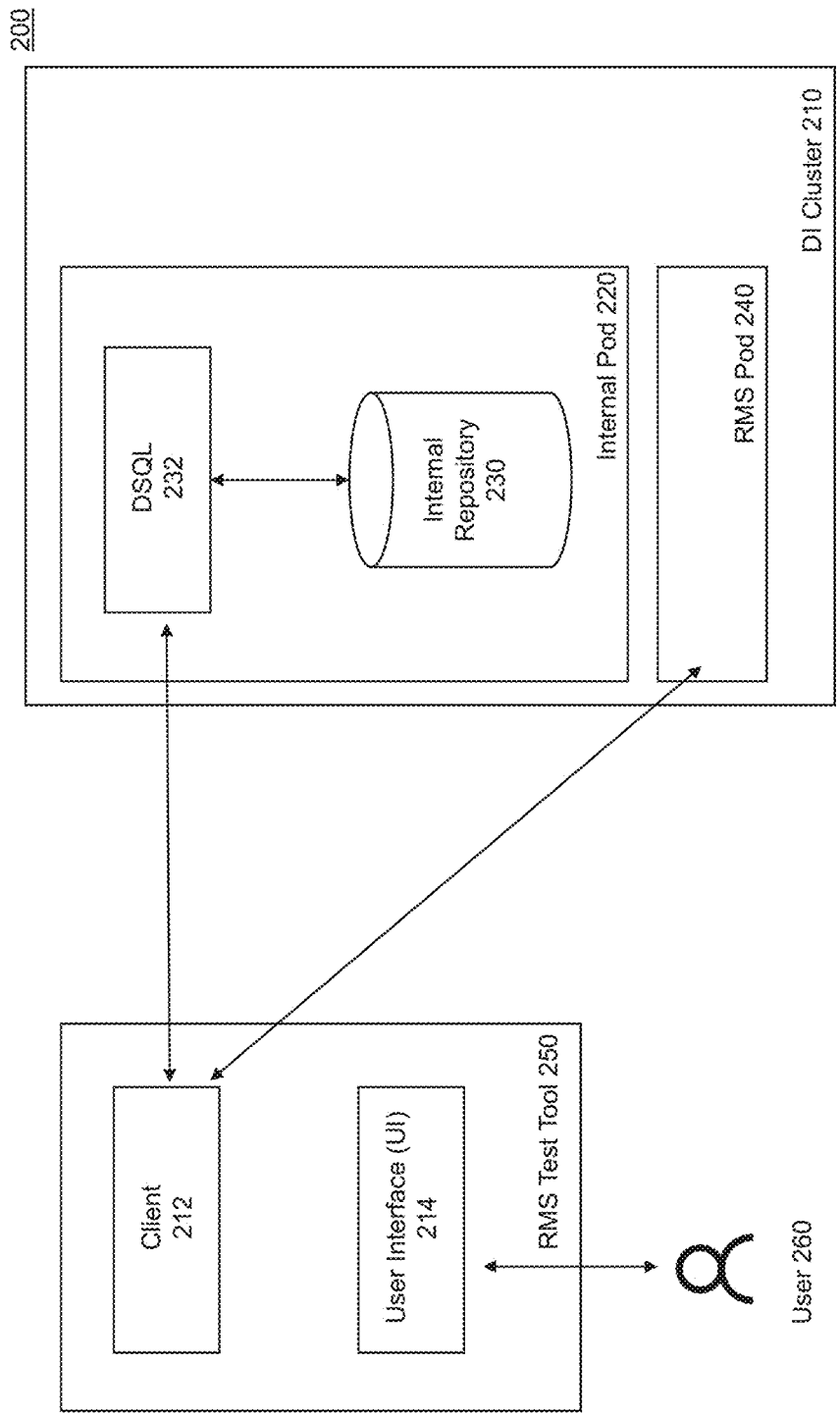
FIG. 2 is a block diagram of a replication management system tool, according to some embodiments.

FIG. 2 is a block diagram 200 of a replication management system tool, according to some embodiments. As a convenience and not a limitation, FIG. 2 may be described with reference to elements of FIG. 1. Block diagram 200 may represent the operation of streaming output data to a UI using a client library and configuration file. The client library may be, for example, a Kubernetes client API. Block diagram 200 may also be performed by computer system 500 of FIG. 5. But block diagram 200 is not limited to that embodiment, and other systems may be used to perform the method as will be understood by those skilled in the art. It is to be appreciated that not all operations may be needed, and the operations may not be performed in the same order as shown in FIG. 2.

As depicted in FIG. 2, a user 260 may access a UI 214, which is located in a RMS test tool 250. RMS test tool 250 may include a container orchestration system client 212. The RMS test tool may communicate with the client 212 or the UI 214. The client 212 may have a command line that is executed and data may be returned in a data stream between the client 212 and the DBSQL 232. The DBSQL 232 may be connected to the internal repository 230. The DBSQL 232 and the internal repository 230 may both be located in the internal pod 220. The client 212 may additionally connect with the RMS pod 240. The RMS pod 240 and internal pod 220 may both be located within the DI Cluster 210.

Implementation of the RMS test tool 250 may be done using Java or the like using the container orchestration system's client library. Specifically, developers may choose a configuration file of the cluster in the RMS test tool 250. The RMS test tool 250 may then use the client library to access the RMS pod 240. An RMS API may be called to get the internal repository credentials. The RMS test tool 250 may then use the client library and the DBSQL inline command and internal repository credentials to get a list of tables from the internal repository 230. A developer may choose one of the tables in the list returned. The RMS test tool 250 may download the content of the table or the metadata of the table in, for example, csv format.

Additionally, the UI design may be implemented using the configuration file of the container orchestration system. The tables may listed from the internal repository 230 and may include data columns such as schema name, table name, or record count. Each line of the table may have an information tab, which allows the metadata of the table to be displayed. The table may be dynamic, meaning the table is constantly updating based on the information being received. Additionally, each line of the table may have a download tab, which allows all content of the table to be exported into csv format. FIG. 3 depicts such examples of tables.

FIG. 3 depicts metadata of a table and the downloaded content of the table, according to some embodiments.

A real world example of the end result of the process may be seen in FIG. 3. In the top table of FIG. 3, metadata for at least one table is depicted. The column name, data type, length, and other various columns are shown. This metadata is from the internal repository table metadata. This may then be extracted into the lower table of FIG. 3. This extraction may be done in csv format, for example. The columns shown may include but are not limited to the table name, a description ID, time stamps, who created the table, last update of the table, etc.

Figure 4:
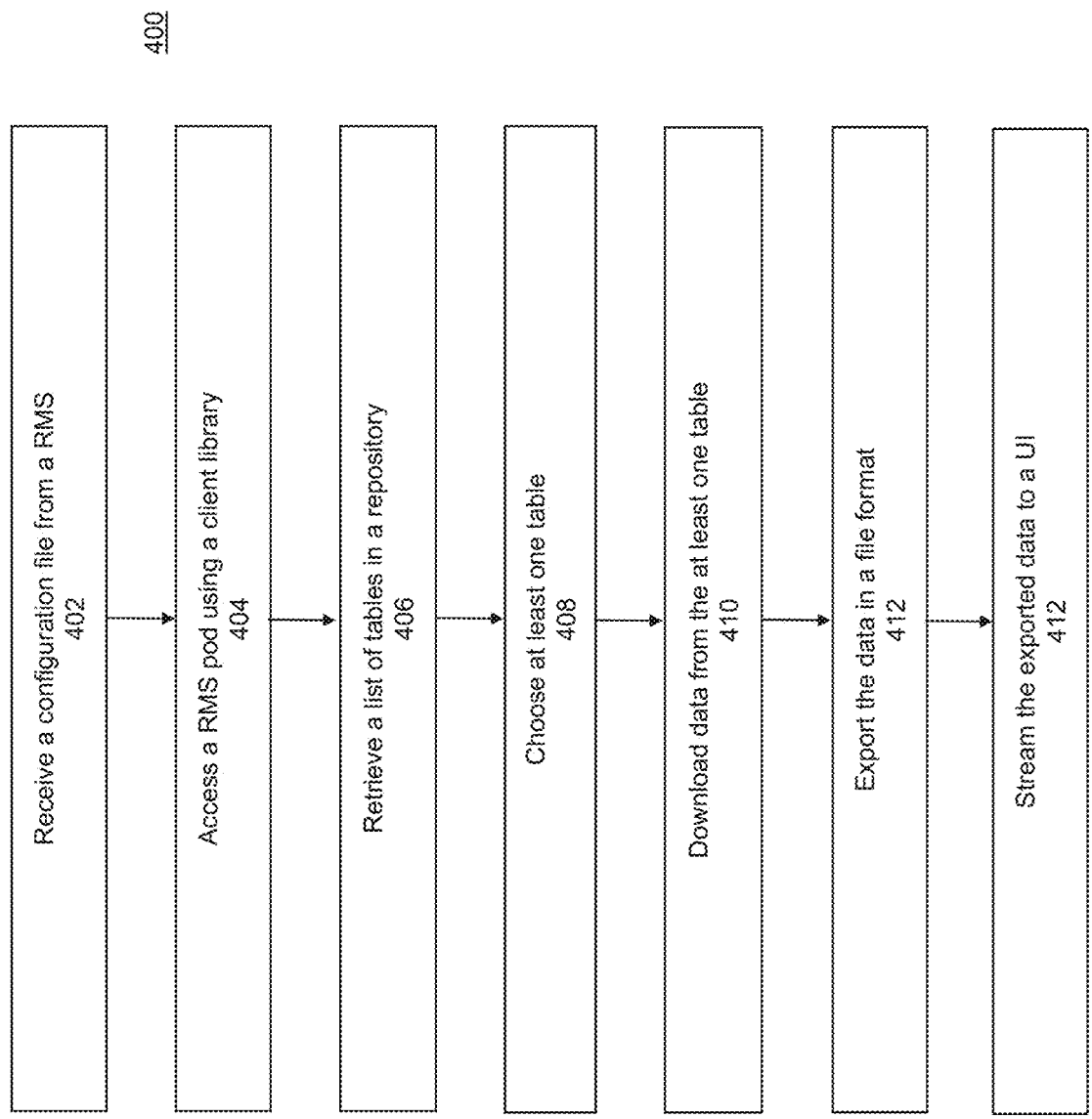
FIG. 4 illustrates a method for extracting data to stream to a user interface (UI) using a client library and configuration file, according to some embodiments.

FIG. 4 is a flowchart for a method 400 for extracting data to stream to a user interface (UI) using a client library and configuration file, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-2. However, method 400 is not limited to that example embodiment.

In 402, RMS test tool 250 receives a configuration file from RMS runtime 120. RMS test tool 250 may be deployed in DI cluster 210. The configuration file may be in the internal repository 230. RMS test tool 250 may be accessed by user 260.

In 404, RMS test tool 250 accesses RMS pod 240 using a client library. The client library may be, for example, a Kubernetes client API. RMS test tool 250 may access RMS pod 240 by calling a RMS API to first retrieve authentication credentials from internal repository 230. RMS test tool 250 may then access RMS pod 240 using the retrieved credentials. Client 212 may access RMS pod 240 through RMS test tool 250.

In 406, RMS test tool 250 retrieves a list of tables from internal repository 230 using the client library. The list of tables may include metadata. The list of tables retrieved may be similar to those depicted in FIG. 3.

In 408, RMS test tool 250 selects at least one table from the retrieved list of tables. RMS test tool 250 may also choose all of the tables in the list. The list of tables chosen may be similar to those depicted in FIG. 3.

In 410, RMS test tool 250 downloads data from the selected one or more tables. The data may include tasks. The data from the tables may be similar to those depicted in FIG. 3.

In 412, RMS test tool 250 exports the data to a readable file format. The readable file format may be a csv file. The data from the tables exported may be similar to those depicted in FIG. 3.

In 414, RMS test tool 250 streams the exported data in the readable file format to the UI. The data may be visible using the UI 214 and may be viewed by the user 260.

Figure 5:
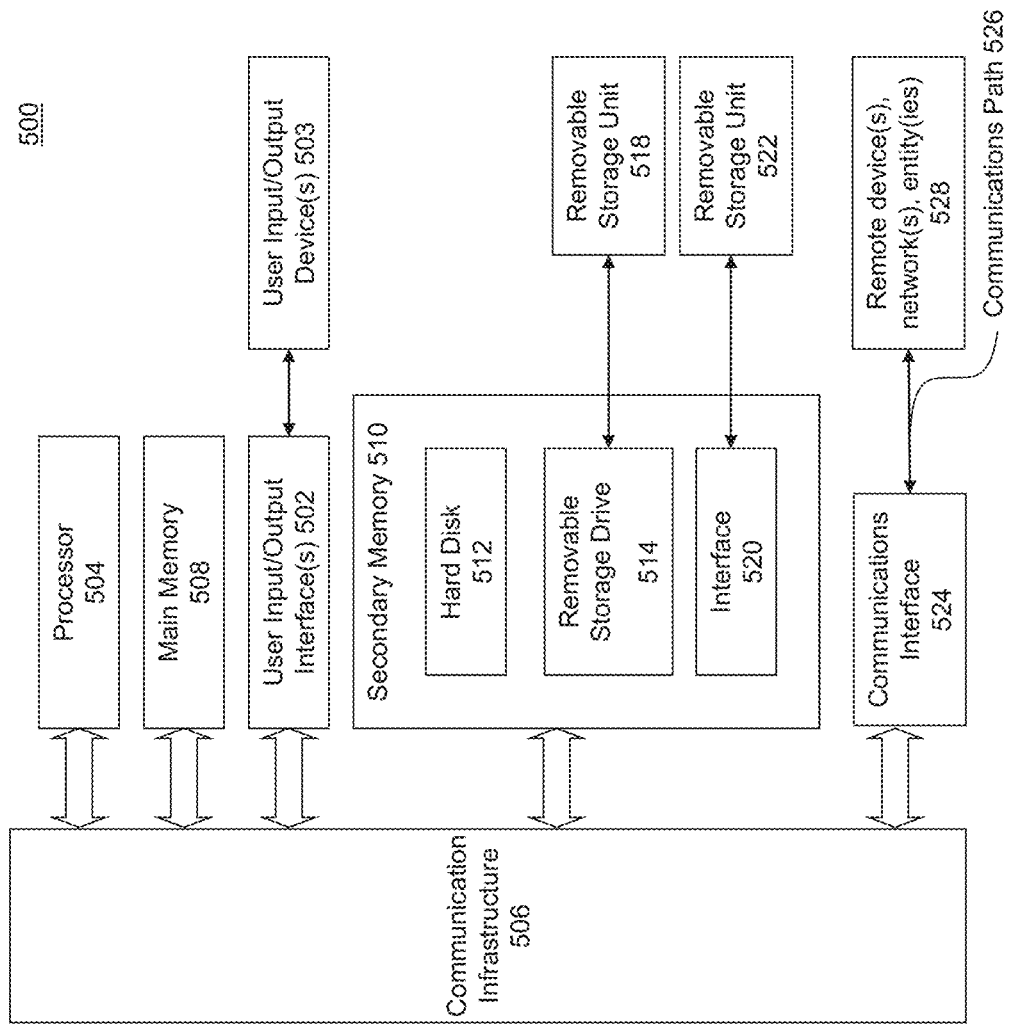
FIG. 5 is an example computer system useful for implementing various embodiments, according to some embodiments.

FIG. 5 is an example computer system 500 useful for implementing various embodiments, according to some embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions, local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for extracting data to output to a user interface (UI) using a client library and a configuration file of a cluster of a container orchestration system implemented in a cloud computing platform, comprising:

receiving, by at least one processor, the configuration file of the cluster for a replication management system (RMS);

accessing, by the at least one processor, an RMS pod of the cluster using the client library to retrieve, from the RMS pod, authentication credentials for a repository located in an internal pod of the cluster, wherein the RMS pod comprises one or more containers executing the RMS on the cloud computing platform, the internal pod comprising one or more containers executing a database structured query language tool for the repository on the cloud computing platform, and the database structured query language tool using a command line to return unformatted data extracted from the repository;

using, by the at least one processor, the retrieved authentication credentials and the client library to retrieve a list of tables from the repository in the internal pod of the cluster;

choosing, by the at least one processor, at least one table from the list of tables;

downloading, by the at least one processor, data stored inside the at least one table, wherein the data includes an error message for a replication task performed by the RMS;

exporting, by the at least one processor, the downloaded data in a readable file format; and outputting, by the at least one processor, the error message alongside the exported data to the UI.

2. The method of claim 1, wherein the accessing comprises:
calling, by the at least one processor, an RMS application programming interface (API) to retrieve the authentication credentials from the RMS pod.

3. The method of claim 1, wherein the list of tables includes metadata based on the repository.

4. The method of claim 1, wherein the readable file format is a comma separated value (csv) file.

5. The method of claim 3, wherein the metadata includes priority, load, schedule, table names, or user ID based on the repository.

6. The method of claim 1, wherein the choosing comprises:
choosing, by the at least one processor, all of the tables in the list of tables.

7. A system for extracting data to output to a user interface (UI) using a client library and a configuration file of a cluster of a container orchestration system implemented in a cloud computing platform, comprising:
a memory; and
at least one processor coupled to the memory and configured to:
receive the configuration file of the cluster for a replication management system (RMS);
access an RMS pod of the cluster using the client library to retrieve, from the RMS pod, authentication credentials for a repository located in an internal pod of the cluster, wherein the RMS pod comprises one or more containers executing the RMS on the cloud computing platform, the internal pod comprising one or more containers executing a database structured query language tool for the repository on the cloud computing platform, and the database structured query language tool using a command line to return unformatted data extracted from the repository;
use the retrieved authentication credentials and the client library to retrieve a list of tables from the repository in the internal pod of the cluster;
choose at least one table from the list of tables;
download data stored inside the at least one table, wherein the data includes an error message for a replication task performed by the RMS;
export the downloaded data in a readable file format; and
output the error message alongside the exported data to the UI.

8. The system of claim 7, wherein to access the RMS pod, the at least one processor is further configured to:
call an RMS application programming interface (API) to retrieve the authentication credentials from the RMS pod.

9. The system of claim 7, wherein the list of tables includes metadata based on the repository.

10. The system of claim 7, wherein the readable file format is a comma separated value (csv) file.

11. The system of claim 9, wherein the metadata includes priority, load, schedule, table names, or user ID based on the repository.

12. The system of claim 7, wherein to choose the at least one table, the at least one processor is further configured to:
choose all of the tables in the list of tables.

13. A non-transitory computer-readable medium having instructions stored thereon that, when executed by at least one computing device, causes the at least one computing device to perform operations comprising:
receiving a configuration file of a cluster of a container orchestration system implemented in a cloud computing platform for a replication management system (RMS);
accessing an RMS pod of the cluster using a client library to retrieve, from the RMS pod, authentication credentials for a repository located in an internal pod of the cluster, wherein the RMS pod comprises one or more containers executing the RMS on the cloud computing platform, the internal pod comprising one or more containers executing a database structured query language tool for the repository on the cloud computing platform, and the database structured query language tool using a command line to return unformatted data extracted from the repository;
using the retrieved authentication credentials and the client library to retrieve a list of tables from the repository in the internal pod of the cluster;
choosing at least one table from the list of tables;
downloading data stored inside the at least one table, wherein the data includes an error message for a replication task performed by the RMS;
exporting the downloaded data in a readable file format; and
outputting the error message alongside the exported data to a user interface (UI).

14. The non-transitory computer-readable medium of claim 13, wherein the accessing comprises:
calling an RMS application programming interface (API) to retrieve the authentication credentials from the RMS pod.

15. The non-transitory computer-readable medium of claim 13, wherein the list of tables includes metadata based on the repository.

16. The non-transitory computer-readable medium of claim 15, wherein the metadata includes priority, load, schedule, table names, or user ID based on the repository.

17. The non-transitory computer-readable medium of claim 13, wherein the choosing comprises:
choosing all of the list of tables in the list of tables.

18. The method of claim 1, further comprising:
 implementing a design of the UI based on the configuration file of the cluster.

19. The system of claim 7, wherein the at least one processor is further configured to:
 implement a design of the UI based on the configuration file of the cluster.

20. The non-transitory computer-readable medium of claim 13, wherein the operations further include:
 implementing a design of the UI based on the configuration file of the cluster.

* * * * *